(12) United States Patent
Durant

(10) Patent No.: US 12,210,356 B2
(45) Date of Patent: Jan. 28, 2025

(54) METHODS FOR OPTIMISING THE ATMOSPHERIC RADIATIVE FORCING OF AIRCRAFT FLIGHT OPERATIONS ON CLIMATE BY FORECASTING AND VALIDATING AIRCRAFT CONTRAIL FORMATION

(71) Applicant: Adam Durant, Cambridge (GB)

(72) Inventor: Adam Durant, Cambridge (GB)

( * ) Notice: Subject to any disclaimer, the term of this patent is extended or adjusted under 35 U.S.C. 154(b) by 160 days.

(21) Appl. No.: 18/000,390

(22) PCT Filed: Oct. 12, 2021

(86) PCT No.: PCT/IB2021/059351
§ 371 (c)(1),
(2) Date: Nov. 30, 2022

(87) PCT Pub. No.: WO2022/079599
PCT Pub. Date: Apr. 21, 2022

(65) Prior Publication Data
US 2023/0273626 A1    Aug. 31, 2023

(30) Foreign Application Priority Data

Oct. 13, 2020  (GB) ...................................... 2016249

(51) Int. Cl.
G05D 1/00    (2024.01)
G01W 1/10    (2006.01)
G08G 5/00    (2006.01)

(52) U.S. Cl.
CPC .............. *G05D 1/106* (2019.05); *G01W 1/10* (2013.01); *G08G 5/0039* (2013.01); *G08G 5/0091* (2013.01); *G01W 2203/00* (2013.01)

(58) Field of Classification Search
CPC .... G05D 1/106; G01W 1/10; G01W 2203/00; F08G 5/0039; F08G 5/0091
See application file for complete search history.

(56) References Cited

U.S. PATENT DOCUMENTS

| 8,406,465 B1 * | 3/2013 | Garrett | ................... | G06V 20/17 |
| | | | | 382/103 |
| 9,739,207 B2 * | 8/2017 | Hillel | ..................... | B64D 31/06 |

(Continued)

FOREIGN PATENT DOCUMENTS

WO    2008145953 A2    12/2008

OTHER PUBLICATIONS

Abramson et al., published "Design of a decision support system to reduce net radiative forcing via optimal contrail generation" in 2017 Systems and Information Engineering Design Symposium (SIEDS), IEEE, on Apr. 28, 2017, pp. 330-335.

(Continued)

*Primary Examiner* — Huan Le
(74) *Attorney, Agent, or Firm* — RC Trademark Company

(57) ABSTRACT

Disclosed is a method for determining an atmospheric radiative forcing difference by optimising or preventing contrail formation caused by an aircraft. The method comprises receiving one or more weather parameters to determine contrail forecast data; receiving one or more flight parameters associated with aircraft to determine flight data; determining tentative atmospheric radiative forcing quantity, along tentative flight trajectory, based on contrail forecast data and flight data; altering one or more flight parameters to determine optimised flight trajectory having optimum atmospheric radiative forcing quantity, wherein optimised flight trajectory is validated using imagery data; and determining an atmospheric radiative forcing difference to evaluate offset value for at least one forcing parameter associated with atmospheric radiative forcing difference. Disclosed also is an apparatus for determining atmospheric radiative forcing caused by aircraft by optimising or preventing contrail formation. Further, disclosed is computer program product to carry out aforementioned method.

19 Claims, 2 Drawing Sheets

(56) References Cited

U.S. PATENT DOCUMENTS

| 10,371,003 B2 † | 8/2019 | Swann | |
|---|---|---|---|
| 2010/0043443 A1* | 2/2010 | Noppel | F02K 1/52 |
| | | | 60/39.5 |
| 2012/0173147 A1 | 7/2012 | Mannstein et al. | |
| 2015/0284102 A1 | 10/2015 | Swann | |
| 2016/0304211 A1 | 10/2016 | Swann | |

OTHER PUBLICATIONS

Combined Search and Examination Report under Sections 17 and 18(3) issued in GB Patent Application No. GB2016249.1 on Mar. 12, 2021, 7 pages.

Notification of Transmittal of the International Search Report and Written Opinion of the International Searching Authority issued in International Patent Application No. PCT/IB2021/059351 on Jan. 14, 2022, 13 pages.

Teoh, Roger et al., "Mitigating the Climate Forcing of Aircraft Contrails by Small-Scale Diversions and Technology Adoption", pp. 2941-2950, Feb. 12, 2020, Environmental Science &Technology, vol. 54.†

Schumann, U. et al., "Contrail study with ground-based cameras", pp. 3597-3612, Dec. 20, 2013, Atmospheric Measurement Techniques, vol. 6.†

Schumann, U., "A contrail cirrus prediction model", pp. 543-580, May 3, 2012, Geoscientific Model Development, vol. 5.†

Schumann, Ulrich et al., "Potential to reduce the climate impact of aviation by flight level changes", pp. 1-22, Jun. 2011, American Institute of Aeronautics and Astronautics, Inc., 3rd AIAA Atmospheric Space Environments Conference, Jun. 27-30, 2011, Honolulu, Hawaii.†

\* cited by examiner
† cited by third party

METHODS FOR OPTIMISING THE ATMOSPHERIC RADIATIVE FORCING OF AIRCRAFT FLIGHT OPERATIONS ON CLIMATE BY FORECASTING AND VALIDATING AIRCRAFT CONTRAIL FORMATION

TECHNICAL FIELD

The present disclosure relates generally to aircraft contrails; more specifically, the present disclosure relates to methods and systems for determining a reduction in the net atmospheric radiative forcing of contrails by optimising flight trajectories and preventing contrail formation caused by an aircraft. Moreover, the present disclosure relates to a computer program product for determining an atmospheric radiative forcing difference by optimising or preventing contrail formation caused by an aircraft by using the aforementioned methods.

BACKGROUND

The global climate system has been affected by various man-made technological advancements, particularly with the rapid expansion of gas-turbine powered passenger and freight aircraft over the last 50 years. Despite the technological advancements in the global aviation industry, a steady increase in the number of in-service aircraft and flights has contributed substantially to a climate impact caused by carbon dioxide in exhaust gases from combustion of aviation fuel, other non-carbon dioxide emissions (e.g. soot, sulphate aerosols etc.), and contrail formation during aircraft cruising.

Condensation trails, or contrails, are left behind by aircraft flying at high altitudes and are an everyday observable phenomenon. These "man-made" cirrus clouds can persist for many hours, depending on characteristics of temperature, humidity, wind, and a stability of the air aloft. Aircraft contrails that persist for several hours (and those that have significant horizontal spreading across the sky) can influence the radiation balance of the atmosphere. In most cases, contrails have a net warming influence (net positive radiative forcing) on the Earth's radiation budget by trapping more outgoing longwave radiation than reflecting incoming shortwave radiation (contrails heat and cool the planet at the same time). However, contrails exclusively have a net warming influence during night-time. Therefore, contrail formation has the potential to contribute significantly to the global atmospheric radiation budget, thereby causing a long-term impact on the Earth's surface temperature (which contributes to the global warming effect). Approximately 60% of the impact of aviation emissions on human-induced climate change can be attributed to contrails. Given that contrails have the potential to significantly impact the global climate system, understanding this impact, and the contribution of the aviation industry to climate change, is of significant importance.

Current technological mitigation of contrail formation includes improvement in engine design (e.g. reduction in weight) and performance (i.e. efficiency), using 'sustainable aviation fuels' (e.g. hydrogen-based aviation fuels), and so forth. There is also a massive recent focus on hydrogen both as a direct propellant and to produce electricity in hydrogen fuel cells. However, such technological mitigation measures are expensive, come with an associated environmental footprint and carbon offset, and fail to effectively mitigate contrail formation. Moreover, the uncertainties associated with contrails (i.e. the age, coverage, optical depth, and atmospheric radiative forcing thereby) pose a challenge in predicting their forcing on the radiation budget of the atmosphere. Historically, various computational prediction models have been developed to estimate the atmospheric radiative forcing due to contrail formation. However, such models have been limited by their horizontal and vertical resolution and have required large computational times in order to parameterize the physics and dynamics of contrail formation. More recent advancements in numerical weather prediction and simulation on high performance computer platforms has allowed for significant improvements within this domain.

Therefore, considering the foregoing discussion, there exists a need to overcome the aforementioned drawbacks associated with conventional mitigation of contrail formation.

SUMMARY

The present disclosure seeks to provide a method for (namely, a method of) determining an atmospheric radiative forcing difference by optimising contrail formation caused by an aircraft. The present disclosure also seeks to provide a system for determining an atmospheric radiative forcing difference by optimising contrail formation caused by an aircraft. The present disclosure further seeks to provide a computer program product for determining an atmospheric radiative forcing difference by optimising contrail formation caused by an aircraft using the aforementioned method. An aim of the present disclosure is to provide a solution that overcomes at least partially the problems encountered in prior art, and provides an efficient and robust solution for reducing the global warming potential and net radiative forcing of contrail formation by a given aircraft and generating an equivalent offset value to compensate for the emission of carbon dioxide and carbon dioxide equivalents by the aircraft.

In one aspect, the present disclosure provides a method for (namely, a method of) determining an atmospheric radiative forcing difference by optimising contrail formation caused by an aircraft, the method comprising:

receiving one or more weather parameters to determine a contrail forecast data;

receiving one or more flight parameters associated with the aircraft to determine a flight data;

determining a tentative atmospheric radiative forcing quantity, along a tentative flight trajectory, based on the contrail forecast data and the flight data;

altering the one or more flight parameters to determine an optimised flight trajectory having an optimum atmospheric radiative forcing quantity, wherein the optimum atmospheric radiative forcing quantity is lesser than the tentative atmospheric radiative forcing quantity, and wherein the optimised flight trajectory is validated using an imagery data; and determining an atmospheric radiative forcing difference, based on the tentative atmospheric radiative forcing quantity and the optimum atmospheric radiative forcing quantity, to evaluate an offset value for at least one forcing parameter associated with the atmospheric radiative forcing difference.

In another aspect, the present disclosure provides an apparatus for determining an atmospheric radiative forcing difference by optimising or preventing contrail formation caused by an aircraft, the system comprising a processing arrangement configured to:

receive one or more weather parameters to determine a contrail forecast data;

receive one or more flight parameters associated with the aircraft to determine a flight data;

determine a tentative atmospheric radiative forcing quantity, along a tentative flight trajectory, based on the contrail forecast data and the flight data;

alter the one or more flight parameters to determine an optimised flight trajectory having an optimum atmospheric radiative forcing quantity, wherein the optimum atmospheric radiative forcing quantity is lesser than the tentative atmospheric radiative forcing quantity, and wherein the optimised flight trajectory is validated using an imagery data; and determine an atmospheric radiative forcing difference, based on the tentative atmospheric radiative forcing quantity and the optimum atmospheric radiative forcing quantity, to evaluate an offset value for at least one forcing parameter associated with the atmospheric radiative forcing difference.

In yet another aspect, the present disclosure provides a computer program product for determining an atmospheric radiative forcing difference by optimising or preventing contrail formation caused by an aircraft, the computer program product comprising a non-transitory machine-readable data storage medium having stored thereon program instructions that, when accessed by a processing arrangement, cause the processing arrangement to carry out the aforementioned method.

Embodiments of the present disclosure substantially eliminate, or at least partially address, the aforementioned problems in the prior art, and enable mitigating contrail formation and their resultant effect on the climate (namely, climate impact) by optimisation of one or more flight parameters, such as a flight plan (including trajectory, fuel data, and so on) associated with the aircraft, and validating such optimisations to improve the prediction models to predict the probability of contrail formation for the aforesaid aircraft for a given flight plan. Moreover, the positive atmospheric radiative forcing difference caused by the aviation is compensated by an offset value, generated based on the aforementioned optimisation, corresponding to the amount of the aforesaid positive atmospheric radiative forcing difference.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
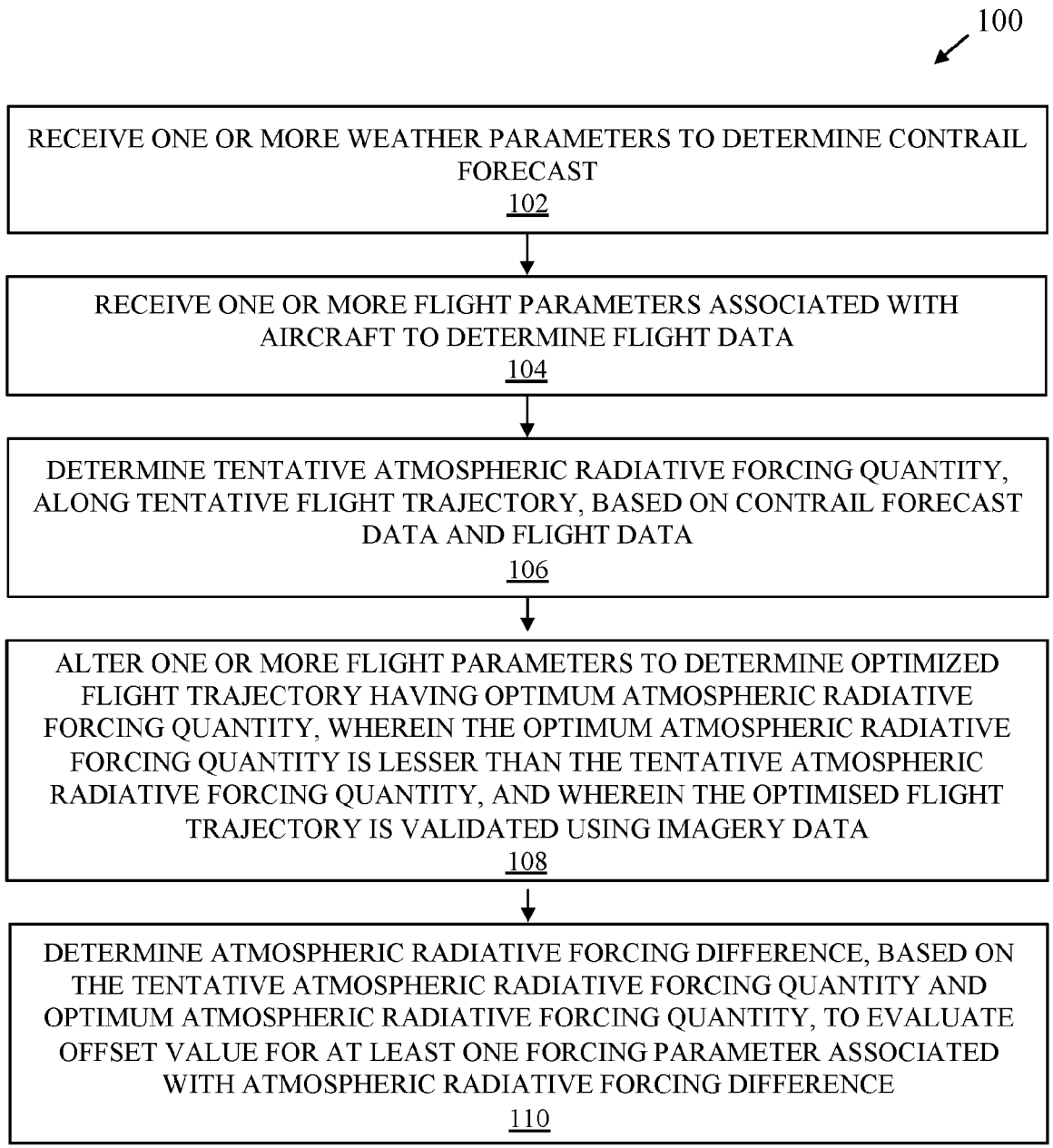
FIG. 1 is a flowchart illustrating steps of a method for determining an atmospheric radiative forcing difference by optimising or preventing contrail formation caused by an aircraft, in accordance with various implementations of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In overview, in one aspect, the present disclosure provides a method for determining an atmospheric radiative forcing difference by optimising or preventing contrail formation caused by an aircraft, the method comprising:

receiving one or more weather parameters to determine a contrail forecast data;

receiving one or more flight parameters associated with the aircraft to determine a flight data;

determining a tentative atmospheric radiative forcing quantity, along a tentative flight trajectory, based on the contrail forecast data and the flight data;

altering the one or more flight parameters to determine an optimised flight trajectory having an optimum atmospheric radiative forcing quantity, wherein the optimum atmospheric radiative forcing quantity is lesser than the tentative atmospheric radiative forcing quantity, and wherein the optimised flight trajectory is validated using an imagery data; and determining an atmospheric radiative forcing difference, based on the tentative atmospheric radiative forcing quantity and the optimum atmospheric radiative forcing quantity, to evaluate an offset value for at least one forcing parameter associated with the atmospheric radiative forcing difference.

In overview, in another aspect, the present disclosure provides an apparatus for determining atmospheric radiative forcing by optimising or preventing contrail formation caused by an aircraft, the system comprising a processing arrangement configured to:

receive one or more weather parameters to determine a contrail forecast data;

receive one or more flight parameters associated with the aircraft to determine a flight data;

determine a tentative atmospheric radiative forcing quantity, along a tentative flight trajectory, based on the contrail forecast data and the flight data;

alter the one or more flight parameters to determine an optimised flight trajectory having an optimum atmospheric radiative forcing quantity, wherein the optimum atmospheric radiative forcing quantity is lesser than the tentative atmospheric radiative forcing quantity, and wherein the optimised flight trajectory is validated using an imagery data; and determine an atmospheric radiative forcing difference, based on the tentative atmospheric radiative forcing quantity and the optimum atmospheric radiative forcing quantity, to evaluate an offset value for at least one forcing parameter associated with the atmospheric radiative forcing difference.

In yet another aspect, an embodiment of the present disclosure provides a computer program product for determining an atmospheric radiative forcing by optimising or preventing contrail formation caused by an aircraft, the computer program product comprising a non-transitory machine-readable data storage medium having stored thereon program instructions that, when accessed by a processing arrangement, cause the processing arrangement to carry out the aforementioned method.

The present disclosure provides a method for determining an atmospheric radiative forcing difference by optimising or preventing contrail formation caused by an aircraft. The method enables regular monitoring of the one or more weather parameters for predicting a contrail forecast and using it and the flight data to determine and optimize the positive atmospheric radiative forcing caused by the aforesaid aircraft. Notably, the method enables validating (or verifying) the merits of the aforesaid optimisation activity. Based on the optimised positive atmospheric radiative forcing, an equivalent offset value is generated to compensate for the positive atmospheric radiative forcing and to reduce the effect of global warming at the Earth's surface. Beneficially, the method is an efficient, effective, and robust alternative to conventional approaches for mitigating the atmospheric radiative forcing due to increasing air travel volume by optimising flight operations and maintenance.

Throughout the present disclosure, the term "atmospheric radiative forcing" as used herein refers to the instantaneous impact of inducing or preventing contrails on the radiation budget and energy flux of the atmosphere (i.e. the difference between insolation (sunlight) absorbed by the Earth and energy radiated back to space) per unit area (globally or in a specified spatial domain) and time. Variations in incoming solar radiation levels, surface albedo, levels of greenhouse gases in the atmosphere (including carbon dioxide, water vapor, etc.) can all, for instance, alter the energy flux of the atmosphere. With respect to contrails, the contrail net radiative forcing is strongly dependent on the local meteorological conditions, the optical properties of the contrail (e.g. surface albedo), the spatial coverage of the contrail, as well as the time and season in which they are formed. The atmospheric radiative forcing is represented in terms of watts per square meter of the Earth's surface ($W/m^2$). Therefore, the larger the value of atmospheric radiative forcing in $W/m^2$, the higher is the impact thereof on the overall climate. Notably, atmospheric radiative forcing may have a positive effect or a negative effect, wherein the positive atmospheric radiative forcing results in a net warming of the Earth's surface while the negative atmospheric radiative forcing results in a net cooling of the Earth's surface. At least one forcing parameter associated with the atmospheric radiative forcing may be selected from: greenhouse gases (for example carbon dioxide ($CO_2$), methane ($CH_4$), nitrous oxide ($N_2O$), ozone ($O_3$), water vapour, perfluorocarbons (PFCs), hydrofluorocarbons (HFCs), and sulphur hexafluoride ($SF_6$)), carbon dioxide equivalents, aerosols, clouds, contrails, and the like.

Throughout the present disclosure, the term "contrail" (condensation trail) as used herein refers to white linear clouds appearing from a cruising aircraft's engine emissions. Under favourable atmospheric conditions, contrails result through the condensation of water vapor in the exhaust of jet engines to form ice crystals. Contrails are typically generated in a stable atmospheric state having ambient relative humidity close or exceeding saturation (i.e. ice supersaturated humidity>=100%) and temperatures below $-40°$ C. (critical temperature, $T_{crit}$). Notably, contrails result in a net warming effect during daytime by both reflecting incoming solar radiation and absorbing outgoing longwave radiation, while exclusively having a net warming effect during the night. The width of the contrails may vary in a range between 0.1-10 kilometres and can also persist for about 200 kilometres.

The method of the present disclosure comprises receiving one or more weather parameters to determine a contrail forecast data. The one or more weather parameters may be obtained from at least one of: statistical models (for example Contrail Cirrus Prediction Model (CoCIP)), dynamical climate models (for example global climate or regional climate models, such as CMIP5, WRF, UM), atmospheric reanalyses datasets (for example ERA5, GFS), or purely observational datasets (for example satellite measurements). Optionally, the one or more weather parameters is selected from: a temperature, a pressure, a water vapour and ice water content, vapour pressure of air and saturated vapour pressure, wind vectors, number of ice particles in the cloud and corresponding particle size, and incoming and outgoing radiation energy in the atmospheric column. The radiation energy in the atmospheric column includes energy entering, reflected, absorbed and emitted by the Earth system. The energy may be associated with the space, the atmosphere, the oceans and geosphere surface of the Earth. Optionally, the contrail forecast data includes a probability of contrail formation and persistency, and radiation budget. The radiation budget is an account of the balance between the incoming radiations such as energy from the space and the atmosphere, for example solar radiation, and outgoing radiation such as reflected solar radiation or radiation emitted from the Earth system (i.e. the atmosphere, the oceans, and geosphere surface of the Earth). Notably, an imbalance in the radiation budget is responsible for the net warming of the Earth's climate, such as that induced by potential contrail formation.

Alternatively, optionally, an ensemble-based probabilistic forecast may be used to determine the contrail forecast data by counting the number of ensemble members which forecast the probability of contrail formation or not. Moreover, vertical simulation profiles of the one or more weather parameters may be generated to calculate the absolute presence and persistence of contrails (i.e. for over 2 minutes). The simulation data is stored in 4-dimensional atmospheric datasets of the vertical simulation profiles for querying, i.e. probability of contrail formation at a given latitude, longitude, altitude and time. Furthermore, the absolute presence and persistence of contrails is determined by the $T_{crit}$, crit and the persistence of the contrails is dependent on the ambient relative humidity of the atmosphere. $T_{crit}$ is dependent on the pressure, ambient relative humidity and temperature.

It will be appreciated that the prediction of $T_{crit}$ and persistency of the predicted contrail is based on the quality of the received one or more weather parameters.

Moreover, the method comprises receiving one or more flight parameters associated with the aircraft to determine a flight data. The one or more flight parameters associated with the aircraft may be obtained from at least one of: an aircraft navigational beacon data (for example Automatic Dependent Surveillance-Broadcast (ADS-B)), engine metric via an original equipment manufacturer (OEM) and airlines. The aircraft navigational beacon data is imported and processed to produce cleaned flight trajectories and schedules corresponding to historical and planned (or future) flights. Optionally, the one or more flight parameters is selected from: a date and time of a flight, a destination, a trajectory, a flight altitude, an expected arrival at the destination, a speed, a latitude for flying the aircraft, a longitude for flying the aircraft, a heading, a payload, an operating characteristic of a particular aircraft type, and a fuel data. The fuel data typically includes a type of fuel, an amount of fuel, a flow rate of fuel, and a combustion time of fuel. Notably, the flight trajectories (historical or planned) and fuel data are combined to produce a flight data for any given aircraft. The flight data is used to query the determined contrail forecast data. Notably, different fuel types have different contrail-forming impacts as a result of particulate emissions (such as black carbon soot) and water vapour (a by-product of the combustion process). In an example, kerosene-based aviation fuel is used predominantly in gas turbine aircraft currently and has a contrail-forming characteristic different from biofuel or hydrogen-based aviation fuel.

Furthermore, the method comprises determining a tentative atmospheric radiative forcing quantity, along a tentative flight trajectory, based on the contrail forecast data and the flight data. The tentative atmospheric radiative forcing quantity is the global warming potential for a given aircraft. The term "global warming potential" as used herein refers to the contribution of contrails (or more specifically carbon dioxide-equivalent emissions from contrails) to the total contribution to global warming. The tentative atmospheric radiative forcing quantity is determined based on the estimation of contrail formations for the given flight, particles size in the cloud, carbon and water emissions from the given flight, and the one or more weather parameters i.e. the existing atmospheric conditions. The tentative atmospheric radiative forcing quantity corresponding to the tentative flight trajectory is an account of emission of carbon dioxide directly from the combustion of the fuel and the emission of carbon dioxide equivalent ($CO_2$-e) due to contrail formation along the chosen or tentative flight trajectory. Preferably, the tentative atmospheric radiative forcing quantity corresponds to the total carbon dioxide equivalent emission associated with the given historic or future flight trajectory.

In some examples, the tentative atmospheric radiative forcing quantity may be determined according to a multi-stage process.

At a first stage, an initial check may be performed to determine whether the thermodynamic criteria for contrail formation are satisfied. The initial check may be based on one or more elements of flight data, for example, an expected propulsion efficiency of the aircraft, an expected combustion heat of the fuel (e.g. expressed in Joules per kilogram of fuel), and an expected water vapour emission index value (e.g. expressed in kilograms of water vapour per kilogram of fuel).

The initial check may be based on one or more elements of weather data e.g. modelled weather data based on the tentative flight trajectory. For example, the initial check may be based on a modelled pressure, ambient air temperature and/or water vapour mixing ratio (e.g. expressed in kilograms of water vapour per kilogram of air). The modelled weather data may be based on one or more elements of flight data such as a flight location (e.g. latitude, longitude, and elevation).

In some examples, a critical temperature may be calculated and compared with the ambient air temperature to predict whether a contrail will be formed, e.g., if the ambient air temperature is below the critical temperature then the formation of a contrail can be predicted.

The first stage may progress to a second stage if it is determined that the thermodynamic criteria for contrail formation are satisfied. In the second stage, an initial prediction for a contrail may be performed. The initial prediction may include generating a prediction for a location and/or geometry of the contrail, and/or a number, size, habit and/or mass of ice particles in the contrail.

The initial prediction may be based on one or more elements of flight data, for example, a mass of the aircraft, a wing geometry of the aircraft (e.g. wingspan), an expected cruise velocity of the aircraft, an expected burn rate of the fuel, and an expected soot emission index value (e.g. expressed as a number of particles per kilogram of fuel).

The initial prediction may be based on one or more elements of weather data, for example, an ice saturation mixing ratio (e.g. as a function of pressure and temperature), a water vapour mixing ratio and an ice survival factor. The modelled weather data may be based on one or more elements of flight data such as a flight location (e.g. latitude, longitude, and elevation).

The initial prediction may include a contrail geometry. The contrail geometry may be based on the wing geometry of the aircraft, the expected cruise velocity of the aircraft and one or more elements of weather data indicating atmospheric conditions.

The initial prediction may include an ice number (e.g. expressed as a number of ice particles per metre travelled). The ice number may be based on the expected burn rate of the fuel, the expected soot emission index value and the ice survival factor. For example, the ice number may be product of these elements.

The initial prediction may include an ice particle mass. The ice particle pass may be based on the expected burn rate of the fuel, the expected water vapour emission index value, the contrail geometry, the density of air, the water vapour mixing ratio and the ice saturation mixing ratio.

In a third stage, the initial production for the contrail may be evolved over time. For example, initial values for the location and/or geometry of the contrail, and/or a number, size, habit and/or mass of ice particles in the contrail may be modified based on a predicted time evolution of the values. The predicted time evolution may be based on one or more elements of weather data, for example, modelled air velocities, ice properties and a predicted energy dissipation rate.

In a fourth stage, radiative properties of the contrail may be calculated. The radiative properties may be based on modelled values for outgoing long wave radiation, reflected solar radiation (e.g. expressed in Watts per metre squared) and/or direct solar radiation (e.g. expressed in Watts per metre squared). The calculated radiative properties of the contrail can be used to determine the tentative atmospheric radiative forcing quantity (e.g. expressed in Joules per metre travelled).

In a fifth stage, a final check may be performed to determine if the contrail has dissipated. For example, the final check may determine whether the number of ice particles is below a threshold number (e.g. 1000 m$^{-3}$), whether the optical thickness is below a threshold thickness (e.g. 0.01) or whether the contrail mass centre is outside an ice super-saturation region (ISSR). If the contrail has not dissipated, the third stage including time evolution of the contrail may be repeated. In this way, the tentative atmospheric radiative forcing quantity may be calculated for a lifetime of the contrail. Alternatively, the tentative atmospheric radiative forcing quantity may be calculated for one point in time and extrapolated for the expected length of the flight. Once the contrail is determined to have dissipated, the multi-stage process may be stopped.

Furthermore, the method comprises altering the one or more flight parameters to determine an optimised flight trajectory having an optimum atmospheric radiative forcing quantity, wherein the optimum atmospheric radiative forcing quantity is lesser than the tentative atmospheric radiative forcing quantity, and wherein the optimised flight trajectory is validated using an imagery data. The optimised flight trajectory is a flight trajectory different from the tentative flight trajectory. Moreover, the flight trajectory with the lowest global warming potential is selected as the optimised flight trajectory. The optimised flight trajectory is associated with an optimum atmospheric radiative forcing quantity different (or lesser) from the tentative atmospheric radiative forcing quantity determined for the tentative flight trajectory. The optimum atmospheric radiative forcing quantity may be calculated in the same way as the tentative atmospheric radiative forcing quantity described above, with the necessary input parameters being changed. It will be appreciated that a lower optimum atmospheric radiative forcing quantity corresponds to a lower probability of contrail formation for a given optimised flight trajectory. Therefore, the optimum atmospheric radiative forcing quantity is associated with a lower global warming potential and thus less atmospheric radiative forcing due to aircraft's carbon dioxide and carbon dioxide equivalent emissions.

Optionally, altering the one or more flight parameters is based on a desired efficiency of re-routing the aircraft and safety aspects. The safety aspects include geo-political safety considerations such as avoiding flying into at least one of: high probability contrail formation zones, warzones, existing weather hazards such as turbulence and thunderstorms, and airports or air space without prior scheduling. In this regard, the optimisation process uses an iterative algorithm that calculates the global warming potential associated with altering one or more flight parameters selected from at least one of: the speed of the aircraft, the altitude for flying the aircraft, a latitude for flying the aircraft, a longitude for flying the aircraft, a heading of the aircraft, a time of flight, the amount of fuel carried by the aircraft, or a combination thereof. In an example, the contrail formation zone is an altitude range having a predefined water vapor content, in the vertical atmospheric column, where the contrails are formed at $T_{crit}$. It will be appreciated that below or above such an altitude crit range, contrail formation is not observed and thus optimised altitude for flying the aircraft may be selected around such an altitude range. Moreover, 4-D maps generated based on the vertical simulation profiles plot contrail formation zones on the given flight trajectory and may guide the pilots to avoid flying into such zones. For example, for a flight from North America to China flying at 36000 feet above the ground, contrails are not observed over countries of the Middle East due to dry and hot weather conditions while contrails are observed in the northern parts of China and United Kingdom. In such example, the altitude for flying the aircraft may be altered from 36000 feet to 32000 feet in areas over northern parts of China and United Kingdom, for example. In another example, the fuel of the aircraft may be changed from 100% kerosene-based aviation fuel to a 60% kerosene-based aviation fuel and 40% biofuel, for example.

Optionally, validating the optimised flight trajectory includes contrail observation along the optimised flight trajectory, wherein the contrail observation comprises:
  capturing, using a first imaging device associated with an aircraft, a first contrail image;
  capturing, using a second imaging device associated with a distant observation system away from the aircraft, a second contrail image; and
  comparing the first and second contrail images to validate the optimised flight trajectory for contrail formation at a given time instant, and wherein the first and second contrail images were taken at a same time instant.

Optionally, in this regard, the optimised flight trajectory is verified for the optimum atmospheric radiative forcing quantity (or the minimum global warming potential) thereof by observing the contrail formation (or not) along the optimised flight trajectory. The validation of the optimised flight trajectory enables determining the merits of altering the one or more flight parameters to determine the optimised flight trajectory (i.e. whether or not it was the right decision to re-route the aircraft). The process of validating includes observing contrail formation. The contrail formation may be observed from an imagery data from a variety of sources including, but not limited to, imaging devices directly associated with the aircraft, satellite observations, machine learning techniques (for example object imagery and object identification, and so on), and convolutional neural networks. It will be appreciated that the validated data may be used to validate and improve the weather prediction model to determine accurate contrail forecast data for future predictions.

Typically, the first imaging device may be an in-built imaging device in the aircraft or mounted on the aircraft, preferable provided at the end of the aircraft facing away from the aircraft in the direction opposite to the direction of flight (i.e. rear-facing). The first imaging device may be for example a digital imaging system, an infrared imaging devices (for example forward-looking infrared (FLIR) camera, long-wave infrared (LWIR) camera, a medium-wave infrared (MWIR) camera, and the like), night vision imaging system, a lidar (namely, a light-based direction and ranging device), and the like.

Optionally, the second contrail image is obtained from at least one of: an active remote sensing system, a passive remote sensing system, and an in-situ measurement system. The active remote sensing system includes lidar and the like, and the passive remote sensing system includes an earth observation sensor on a satellite (such as the geostationary and/or polar-orbiting satellites) or a camera at the surface of the Earth. The in-situ observation system includes a laser light scattering device on a research aircraft, meteorological radiosondes, a multispectral thermal-infrared imaging spectroradiometer, or an airborne Moderate Resolution Imaging Spectroradiometer (MODIS) simulator, for example. It will be appreciated that the contrails need to be of a predefined size, such as at least 1 kilometre wide, in order to be detected by the distant observation system, such as a satellite.

Moreover, the optimisation process includes determining a total saving in the carbon dioxide equivalent for the optimised flight trajectory. The total saving in the carbon dioxide equivalent for the optimised flight trajectory is determined by calculating a difference between the tentative atmospheric radiative forcing quantity and the optimum atmospheric radiative forcing quantity. Beneficially, the total saving in the carbon dioxide equivalent for the optimised flight trajectory corresponds to the avoidance of contrail formation when flying through the optimised flight trajectory. Additionally, the total saving in the carbon dioxide equivalent is quantified for a given flight, or a collection of flights, both historically and for planned (or future) flights.

Furthermore, the method comprises determining the atmospheric radiative forcing difference, based on the tentative atmospheric radiative forcing quantity and the optimum atmospheric radiative forcing quantity, to evaluate the offset value for at least one forcing parameter associated with the atmospheric radiative forcing difference. The term "atmospheric radiative forcing difference" as used herein refers to a net radiative forcing difference (defined as the difference between the tentative radiative forcing quantity and the optimum radiative forcing quantity) per unit area (globally or in a specified spatial domain) and time. Therefore, the atmospheric radiative forcing difference provides a net atmospheric radiative forcing produced due to optimisation of the one or more flight parameters. As mentioned earlier, the atmospheric radiative forcing is generated by a number of forcing parameters, such as greenhouse gases and/or other greenhouse gas equivalents. The term "offset value" as used herein refers to a reduction in emission of such greenhouse gases and/or other greenhouse gas equivalents effected by technological interventions to reduce the global greenhouse effect. The technological interventions typically include investment in projects elsewhere which represent a reduction in the emissions of the greenhouse gases and/or other greenhouse gas equivalents. Such projects include, for example, renewable energy-based projects (for example, wind power, solar power, hydroelectric power, biofuel, and the like), methane collection and combustion systems, energy efficient models, tree-planting projects, and the like.

Notably, the offset values are offset credits for trade between offset vendors (such as parties under various environmental and trade organizations, such as for example, the Kyoto Protocol, EU Emission Trading Scheme) and buyers (such as individuals, companies, governments, or other entities). Moreover, the offset vendors are organizations that voluntarily offset their contrail net radiative forcing with the aim of promoting sustainability. The buyers of the offset value are companies that emit greenhouse gases as a by-product of their business. Such companies are required to either cut their emissions or buy offsets in lieu thereof. It will be appreciated that the offset value is proportional to the emission of greenhouse gases and/or other greenhouse gas equivalents generated by human activities, in the present case, aviation. The total saving in the atmospheric radiative forcing, i.e. the atmospheric radiative forcing difference, is reported in a variety of ways including through mandatory or voluntary disclosure regimes. Notably, the disclosure regimes are determined by a company and/or a country of the location of the company. In an exemplary implementation, the atmospheric radiative forcing difference may be reported in annual reports of the company or through international obligations such as the Paris Agreement. In an alternate exemplary implementation, the atmospheric radiative forcing difference may be incorporated into the offset schemes, such as regional and international emissions trading schemes, for example the Carbon Offsetting and Reduction Scheme for International Aviation (CORSIA). In such case, the atmospheric radiative forcing difference may be converted to a suitable offset value.

Moreover, a suitable offset value is generated for a corresponding at least one forcing parameter associated with the atmospheric radiative forcing difference. As mentioned earlier, the at least one forcing parameter may be carbon dioxide ($CO_2$), methane ($CH_4$), nitrous oxide ($N_2O$), ozone ($O_3$, water vapour, perfluorocarbons (PFCs), hydrofluorocarbons (HFCs), sulphur hexafluoride ($SF_6$)), carbon dioxide equivalents, aerosols, clouds, contrails, and the like. In an example, for carbon dioxide, a carbon dioxide offset value is generated. In such an example, if in the year 2018, the impact on global warming from aviation is $1.834 \times 10^9$ tonnes of carbon dioxide and/or carbon dioxide equivalent, the result is a loss of 1 billion tonnes of carbon dioxide equivalent from the climate by avoiding 50% of contrail formation, through contrail forecasting and flight optimisation. Then, for this example, at a carbon price of $10/tonnes, the atmospheric radiative forcing difference equates to a carbon offset market value of around $10 billion per annum.

Optionally, the method further comprises optimising maintenance activity for an engine of the aircraft based on the atmospheric radiative forcing difference, and wherein the optimisation of maintenance activity for the engine comprises:
  receiving a data associated with the engine of the aircraft;
  generating an engine simulation model based on the received data for predicting a condition of the engine of the aircraft; and
  determining a maintenance activity to be performed on the engine based on the predicted condition of the engine.

Optionally, in this regard, the maintenance activity for the engine of the aircraft is determined to enable an improved efficiency of combustion of the fuel in the engine and reduced emission of carbon dioxide or carbon dioxide equivalents from the exhaust of the aircraft. The data associated with the engine of the aircraft may include a type of engine, an age of the engine, an information about the OEM, a type of fuel, an amount of fuel carried by the engine, a flow rate of fuel, and a combustion time of fuel, a last clean-up information for the engine, a chemical analysis of the debris in the exhaust of the engine, and so on. The data associated with the engine of the aircraft is used to predict a present condition of the engine of the aircraft, such as amount of soot in the exhaust, nature of corrosion, amount of damage, and so on. The maintenance activity includes, but is not limited to, a change in fuel (for example shifting to green aviation fuels, such as biofuels, or hydrogen-based aviation fuels), removal of soot particles from the exhaust by proper cleaning thereof, adapting to an improved engine design, and so forth.

The present disclosure also relates to the apparatus as described above. Various embodiments and variants disclosed above apply mutatis mutandis to the apparatus.

Optionally, the processing arrangement comprises various modules like a weather prediction module, a trajectory module, an engine module, an atmospheric radiative forcing module, an optimisation module, a validation module, and an offset module. The processing arrangement is configured to receive one or more weather parameters using the weather prediction module to determine the contrail forecast data. Moreover, the contrail forecast data is provided as an output of the weather prediction module. The processing arrangement is configured to receive one or more flight parameters associated with the aircraft to determine the flight data using the trajectory and engine modules. The processing arrangement is configured to determine the tentative atmospheric radiative forcing quantity, along the tentative flight trajectory, based on the contrail forecast data and the flight data using the atmospheric radiative forcing module. The processing arrangement is configured to alter the one or more flight parameters using the optimisation module to determine the optimised flight trajectory having the optimum atmospheric radiative forcing quantity, wherein the optimum atmospheric radiative forcing quantity is lesser (namely, smaller than) than the tentative atmospheric radiative forcing quantity. The processing arrangement is configured to validate the optimised flight trajectory using the imagery data obtained by the validation module. The processing arrangement is configured to determining the atmospheric radiative forcing difference, based on the tentative atmospheric radiative forcing quantity and the optimum atmospheric radiative forcing quantity, to evaluate an offset value for at least one forcing parameter associated with the atmospheric radiative forcing difference using the offset module.

Optionally, the one or more weather parameters is selected from: a temperature, a pressure, a water vapour and ice water content, vapour pressure of air and saturated vapour pressure, wind vectors, number of ice particles in the cloud and corresponding particle size, and incoming and outgoing radiation energy in the atmospheric column.

Optionally, the contrail forecast data includes a probability of contrail formation and persistency and a radiation budget of the atmospheric column.

Optionally, the one or more flight parameters is selected from: a date and time of a flight, a destination, a trajectory, an expected arrival at the destination, a speed, a latitude for flying the aircraft, a longitude for flying the aircraft, a heading, a payload, an operating characteristic of a particular aircraft type, a flight altitude, and a fuel data.

Optionally, the system for validating the optimised flight trajectory includes contrail observation along the optimised flight trajectory, wherein the contrail observation comprises:
 a first imaging device associated with an aircraft configured to capture a first contrail image;
 a second imaging device associated with a distant observation system away from the aircraft configured to capture a second contrail image; and
 the processing arrangement configured to compare the first and second contrail images to validate the optimised flight trajectory for contrail formation at a given time instant, and wherein the first and second contrail images were taken at a same time instant.

Optionally, the second contrail image is obtained from at least one of: an active remote sensing system, a passive remote sensing system, and an in-situ measurement system.

In some embodiments, the apparatus described above may be implemented as part of a system including an airline operator and/or an air navigation server provider (ANSP).

For example, receiving one or more flight parameters associated with the aircraft to determine a flight data may include requesting one or more flight plans from the airline operator and/or ANSP.

In some examples, the airline operator may have previously signed an agreement with an operator of the apparatus, e.g. a contrails offset project agreement.

The airline operator may generate the flight plan based on one or more flight parameters substantially as described above. For example, the flight plan may be generated based on: a date and time of a flight, a destination, a trajectory, a flight altitude, an expected arrival at the destination, a speed, a latitude for flying the aircraft, a longitude for flying the aircraft, a heading, a payload, an operating characteristic of a particular aircraft type, and a fuel data. The flight plan may be generated by a flight planning software (FPS). In some examples, the airline operator may submit the generated flight plan to the ANPS. The generated flight plan may be referred to as an initial, provisional or baseline flight plan.

The generated flight plan may also be referred to as the tentative flight trajectory or may include the tentative flight trajectory. The apparatus may determine tentative atmospheric radiative forcing quantity, along the tentative flight trajectory and alter the one or more flight parameters to determine an optimised flight trajectory having an optimum atmospheric radiative forcing quantity.

In some examples, the apparatus may send or otherwise provide the optimised flight trajectory to the airline operator and/or the ANSP. The airline operator may generate a revised flight plan based to optimised flight trajectory. For example, the airline operator may use the FPS to generate the revised plan using the optimised flight trajectory as an additional input. The airline operator may submit the revised flight plan to the ANSP.

In some examples, the airline operator may perform a flight according to the revised flight plan. That is, the airline operator may fly an aircraft along the optimised flight trajectory. In some examples, new flight data may be available during flight, e.g., current or up-to-date weather data. New data may be made available to the airline operator, a pilot of the aircraft and/or the ANSP, for example, via an internet-connector device or application (e.g., an electronic flight bag), or via an air traffic control service. Any of the airline operator, pilot and/or ANSP may have opportunity to optimise the flight trajectory, based on the new flight data.

As described above, the apparatus may be configured to validate the optimised flight trajectory using an imagery data, e.g. based on the flight performed, and may determine an atmospheric radiative forcing difference between the initial flight plan and the revised flight plan.

In some examples, as described above, the atmospheric radiative forcing difference may be incorporated into an offset scheme, such as the Carbon Offsetting and Reduction Scheme for International Aviation (CORSIA). In such case, the atmospheric radiative forcing difference may be converted to a suitable offset value such as carbon dioxide equivalent (CO2e) units. Such units may be offset against emissions e.g. to meet regulatory requirements, and/or traded for monetary value. In some examples, the offset units may be allocated to the airline operator and/or the operator of the apparatus.

The present disclosure also relates to the computer program product as described above. Various embodiments and variants disclosed above apply mutatis mutandis to the computer program product.

Optionally, the computer program product is implemented as an algorithm, embedded in a software stored in the non-transitory machine-readable data storage medium. The non-transitory machine-readable data storage medium may include, but is not limited to, an electronic storage device, a magnetic storage device, an optical storage device, an electromagnetic storage device, a semiconductor storage device, or any suitable combination of the foregoing. Examples of implementation of the computer-readable medium include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

In this regard, the algorithm quantifies the climate impact caused by an aircraft and optimises an aircraft flight plan or in-flight trajectory to prevent contrail formation by using the aforementioned methods.

Optionally, the program instructions cause the processing arrangement to:
receive one or more weather parameters to determine the contrail forecast data;
receive one or more flight parameters associated with the aircraft to determine the flight data;
determine the tentative atmospheric radiative forcing quantity, along the tentative flight trajectory, based on the contrail forecast data and the flight data;
alter the one or more flight parameters to determine the optimised flight trajectory having the optimum atmospheric radiative forcing quantity, wherein the optimum atmospheric radiative forcing quantity is lesser (namely, in smaller than) than the tentative atmospheric radiative forcing quantity, and wherein the optimised flight trajectory is validated using the imagery data; and
determine the atmospheric radiative forcing difference, based on the tentative atmospheric radiative forcing quantity and the optimum atmospheric radiative forcing quantity, to evaluate an offset value for at least one forcing parameter associated with the atmospheric radiative forcing difference.

Optionally, the program instructions cause the processing arrangement to compare the first and second contrail images, captured using the first imaging device associated with the aircraft and the second imaging device associated with a distant observation system away from the aircraft, respectively, to validate the optimised flight trajectory for contrail formation at a given time instant, and wherein the first and second contrail images were taken at a same time instant.

DETAILED DESCRIPTION OF THE DRAWINGS

Referring to FIG. 1, a flowchart is shown illustrating steps of a method for determining an atmospheric radiative forcing difference by optimising or preventing contrail formation caused by an aircraft, in accordance with various embodiments of the present disclosure. At a step 102, one or more weather parameters are received to determine a contrail forecast data. At a step 104, one or more flight parameters associated with the aircraft are received to determine a flight data. At a step 106, a tentative atmospheric radiative forcing quantity, along a tentative flight trajectory, is determined based on the contrail forecast data and the flight data. At a step 108, the one or more flight parameters is altered to determine an optimised flight trajectory having an optimum atmospheric radiative forcing quantity, wherein the optimum atmospheric radiative forcing quantity is lesser than (namely, smaller than) the tentative atmospheric radiative forcing quantity, and wherein the optimised flight trajectory is validated using an imagery data. At a step 110, the atmospheric radiative forcing difference is determined based on the tentative atmospheric radiative forcing quantity and the optimum atmospheric radiative forcing quantity, to evaluate an offset value for at least one forcing parameter associated with the atmospheric radiative forcing difference.

The steps 102, 104, 106, 108 and 110 are only illustrative and other alternatives can also be provided where one or more steps are added, one or more steps are removed, or one or more steps are provided in a different sequence without departing from the scope of the claims herein.

Figure 2:
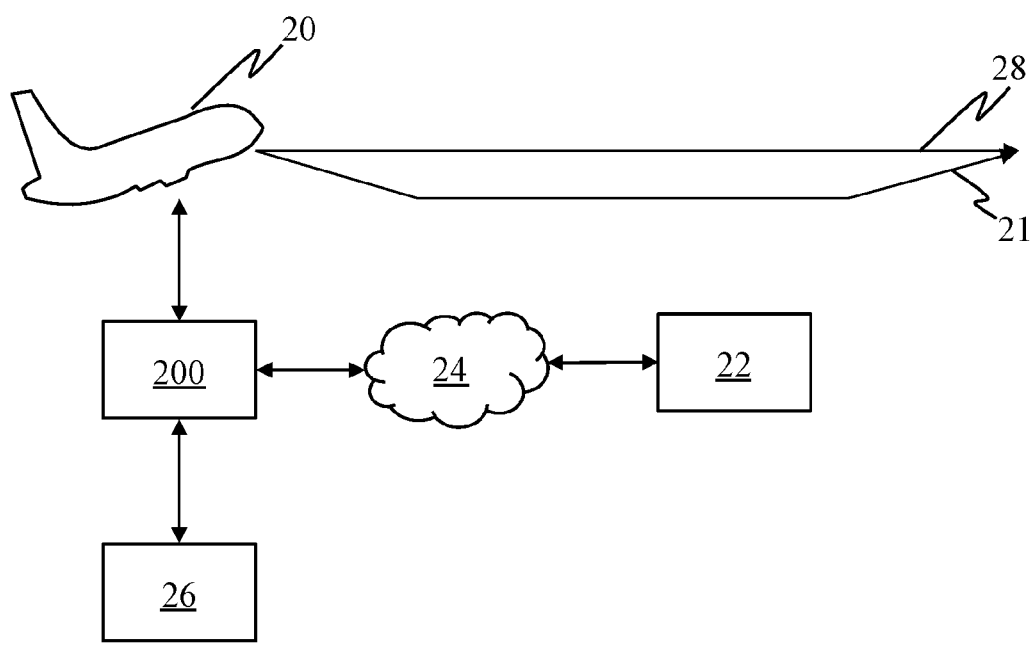
FIG. 2 is a schematic illustration of an apparatus for determining an atmospheric radiative forcing difference by optimising or preventing contrail formation caused by an aircraft, in accordance with an implementation of the present disclosure.

Referring to FIG. 2, there is illustrated an apparatus 200 for determining atmospheric radiative forcing for an aircraft 20 by optimising contrail formation, in accordance with various embodiments of the present disclosure. The apparatus 200 comprises a processing arrangement. The processing arrangement of the system 200 is coupled to a weather monitoring system 26 and the aircraft 20. The processing arrangement is configured:
(i) to receive one or more weather parameters, from the weather monitoring system 26, to determine a contrail forecast data;
(ii) to receive one or more flight parameters associated with the aircraft 20 to determine a flight data;
(iii) to determine a tentative atmospheric radiative forcing quantity, along a tentative flight trajectory 28, based on the contrail forecast data and the flight data;
(iv) to alter the one or more flight parameters to determine an optimised flight trajectory 21 having an optimum atmospheric radiative forcing quantity, wherein the optimum atmospheric radiative forcing quantity is lesser than (namely, smaller than) the tentative atmospheric radiative forcing quantity, and wherein the optimised flight trajectory 21 is validated using an imagery data, such as from a distant observation system 22 away from the aircraft 20; and
(v) to determine the atmospheric radiative forcing difference, based on the tentative atmospheric radiative forcing quantity and the optimum atmospheric radiative forcing quantity, to evaluate an offset value for at least one forcing parameter associated with the atmospheric radiative forcing difference.

The processing arrangement is communicably coupled to the distant observation system 22 via a communication network 24.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for determining an atmospheric radiative forcing difference by optimising contrail formation caused by an aircraft, the method comprising:
receiving one or more weather parameters to determine a contrail forecast data;
receiving one or more flight parameters associated with the aircraft to determine a flight data;
determining a tentative atmospheric radiative forcing quantity, along a tentative flight trajectory, based on the contrail forecast data and the flight data;
altering the one or more flight parameters to determine an optimised flight trajectory having an optimum atmospheric radiative forcing quantity, wherein the optimum atmospheric radiative forcing quantity is lesser than the tentative atmospheric radiative forcing quantity, and wherein the optimised flight trajectory is validated using an imagery data; and
determining the atmospheric radiative forcing difference, based on the tentative atmospheric radiative forcing quantity and the optimum atmospheric radiative forcing quantity, to evaluate an offset value for at least one forcing parameter associated with the atmospheric radiative forcing difference.

2. The method of claim 1, wherein the one or more weather parameters is selected from: a temperature, a pressure, a water vapour and ice water content, vapour pressure of air and saturated vapour pressure, wind vectors, number of ice particles in the cloud and corresponding particle size, and incoming and outgoing radiation energy in the atmospheric column.

3. The method of claim 1, wherein the contrail forecast data includes a probability of contrail formation and persistency and a radiation budget of the atmospheric column.

4. The method of claim 1, wherein the one or more flight parameters is selected from: a date and time of a flight, a destination, a trajectory, a flight altitude, an expected arrival at the destination, a speed, a latitude for flying the aircraft, a longitude for flying the aircraft, a heading, a payload, an operating characteristic of a particular aircraft type, and a fuel data.

5. The method of claim 1, wherein validating the optimised flight trajectory includes contrail observation along the optimised flight trajectory, wherein the contrail observation comprises:
  capturing, using a first imaging device associated with an aircraft, a first contrail image;
  capturing, using a second imaging device associated with a distant observation system-away from the aircraft, a second contrail image; and
  comparing the first and second contrail images to validate the optimised flight trajectory for contrail formation at a given time instant, and wherein the first and second contrail images were taken at a same time instant.

6. The method of claim 5, wherein the second contrail image is obtained from at least one of: an active remote sensing system, a passive remote sensing system, and an in-situ measurement system.

7. The method of claim 1, wherein altering the one or more flight parameters is based on a desired efficiency of re-routing the aircraft and safety aspects.

8. The method of claim 1, wherein the at least one forcing parameter associated with the atmospheric radiative forcing difference is at least one of a greenhouse gas or greenhouse gas equivalent.

9. The method of claim 1, wherein the determined atmospheric radiative forcing difference is converted to carbon dioxide equivalent (CO2e) units.

10. A computer program product for determining atmospheric radiative forcing by optimising or preventing contrail formation caused by an aircraft, the computer program product comprising a non-transitory machine-readable data storage medium having stored thereon program instructions that, when accessed by a processing arrangement, cause the processing arrangement to carry out the method of claim 1.

11. The computer program product of claim 10, wherein the program instructions cause the processing arrangement to compare the first and second contrail images, captured using a first imaging device associated with an aircraft and a second imaging device associated with a distant observation system away from the aircraft, respectively, to validate the optimised flight trajectory for contrail formation at a given time instant, and wherein the first and second contrail images were taken at a same time instant.

12. An apparatus for determining atmospheric radiative forcing by optimising or preventing contrail formation caused by an aircraft, the apparatus comprising a processing arrangement configured to:
  receive one or more weather parameters to determine a contrail forecast data;
  receive one or more flight parameters associated with the aircraft to determine a flight data;
  determine a tentative atmospheric radiative forcing quantity, along a tentative flight trajectory, based on the contrail forecast data and the flight data;
  alter the one or more flight parameters to determine an optimised flight trajectory having an optimum atmospheric radiative forcing quantity, wherein the optimum atmospheric radiative forcing quantity is lesser than the tentative atmospheric radiative forcing quantity, and wherein the optimised flight trajectory is validated using an imagery data; and
  determine the atmospheric radiative forcing difference, based on the tentative atmospheric radiative forcing quantity and the optimum atmospheric radiative forcing quantity, to evaluate an offset value for at least one forcing parameter associated with the atmospheric radiative forcing difference.

13. The apparatus of claim 12, wherein the one or more weather parameters is selected from: a temperature, a pressure, a water vapour and ice water content, vapour pressure of air and saturated vapour pressure, wind vectors, number of ice particles in the cloud and corresponding particle size, and incoming and outgoing radiation energy in the atmospheric column.

14. The apparatus of claim 12, wherein the contrail forecast data includes a probability of contrail formation and persistency and a radiation budget of the atmospheric column.

15. The apparatus of claim 12, wherein the one or more flight parameters is selected from:
  a date and time of a flight, a destination, a trajectory, a flight altitude, an expected arrival at the destination, a speed, a latitude for flying the aircraft, a longitude for flying the aircraft, a heading, a payload, an operating characteristic of a particular aircraft type, and a fuel data.

16. The apparatus of claim 12, wherein the system for validating the optimised flight trajectory includes contrail observation along the optimised flight trajectory, wherein the contrail observation comprises:
  a first imaging device associated with an aircraft configured to capture a first contrail image;
  a second imaging device associated with a distant observation system away from the aircraft configured to capture a second contrail image; and
  the processing arrangement configured to compare the first and second contrail images to validate the optimised flight trajectory for contrail formation at a given time instant, and wherein the first and second contrail images were taken at a same time instant.

17. The apparatus of claim 16, wherein the second contrail image is obtained from at least one of: an active remote sensing system, a passive remote sensing system, and an in-situ measurement system.

18. The apparatus of claim 12, wherein the at least one forcing parameter associated with the atmospheric radiative forcing difference is at least one of a greenhouse gas or greenhouse gas equivalent.

19. The apparatus of claim 12, wherein the determined atmospheric radiative forcing difference is converted to carbon dioxide equivalent (CO2e) units.

* * * * *